(12) United States Patent
Hoyer

(10) Patent No.: US 6,612,960 B1
(45) Date of Patent: Sep. 2, 2003

(54) TRANSMISSION WITH NON-COAXIAL OUTPUT

(75) Inventor: Herbert Hoyer, Langenargen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 09/763,265
(22) PCT Filed: Aug. 14, 1999
(86) PCT No.: PCT/EP99/05977
§ 371 (c)(1),
(2), (4) Date: Feb. 20, 2001
(87) PCT Pub. No.: WO00/11373
PCT Pub. Date: Mar. 2, 2000

(30) Foreign Application Priority Data

Aug. 20, 1998 (DE) .......................... 198 37 776

(51) Int. Cl.[7] ................................. F16H 3/44
(52) U.S. Cl. .................. 475/302; 475/303; 74/325
(58) Field of Search .......... 74/325, 745, 360; 475/303, 302; 192/216

(56) References Cited

U.S. PATENT DOCUMENTS

| 2,835,143 | A | * | 5/1958 | Kelbel | 180/250 |
| 4,041,805 | A | * | 8/1977 | Jochmann | 192/25 |
| 4,308,763 | A | | 1/1982 | Brisabois | 74/700 |
| 4,318,305 | A | * | 3/1982 | Wetrich et al. | 475/198 |
| 4,677,874 | A | | 7/1987 | Friedrich | 475/206 |
| 4,819,774 | A | | 4/1989 | Bieber | 192/4 A |
| 4,858,495 | A | * | 8/1989 | Horsch | 74/359 |
| 5,239,887 | A | * | 8/1993 | Muller et al. | 74/665 GA |
| 5,383,374 | A | * | 1/1995 | Reynolds | 74/15.66 |
| 5,390,347 | A | | 2/1995 | Buri et al. | 475/303 |
| 5,445,041 | A | * | 8/1995 | Zaiser et al. | 74/325 |
| 5,511,437 | A | * | 4/1996 | Braun | 74/331 |
| 5,761,961 | A | * | 6/1998 | Krauss et al. | 74/325 |
| 5,823,051 | A | * | 10/1998 | Hall, III | 475/207 |
| 5,944,160 | A | * | 8/1999 | Adams et al. | 188/296 |
| 5,996,762 | A | * | 12/1999 | Edelmann et al. | 123/41.31 |

FOREIGN PATENT DOCUMENTS

| DE | 31 16 383 A1 | 5/1982 |
| DE | 31 43 819 A1 | 7/1982 |
| DE | 36 07 602 A1 | 10/1986 |
| DE | 195 38 192 A1 | 4/1997 |
| GB | 1162333 | 8/1969 |
| GB | 2 088 974 A | 6/1982 |
| WO | 86/02608 | 5/1986 |
| WO | 92/01173 | 1/1992 |

* cited by examiner

Primary Examiner—Rodney H Bonck
Assistant Examiner—David D. Le
(74) Attorney, Agent, or Firm—Davis & Bujold, P.L.L.C.

(57) ABSTRACT

A vehicle transmission having an input shaft, a main shaft, a countershaft and an output shaft mounted for rotation around axes of rotation and a plurality of gear wheels mounted on the countershaft and the output shaft for the transmission of torque from the input shaft to the output shaft at a gear ratio provided by the gears. The axis of rotation of the main shaft and the axis of rotation of the output shaft do not lie along the same axis and the distance between the axes of rotation of main shaft and output shaft is determined by the reduction ratio of a constant gear wheel pair located between the countershaft and the output shaft.

5 Claims, 3 Drawing Sheets

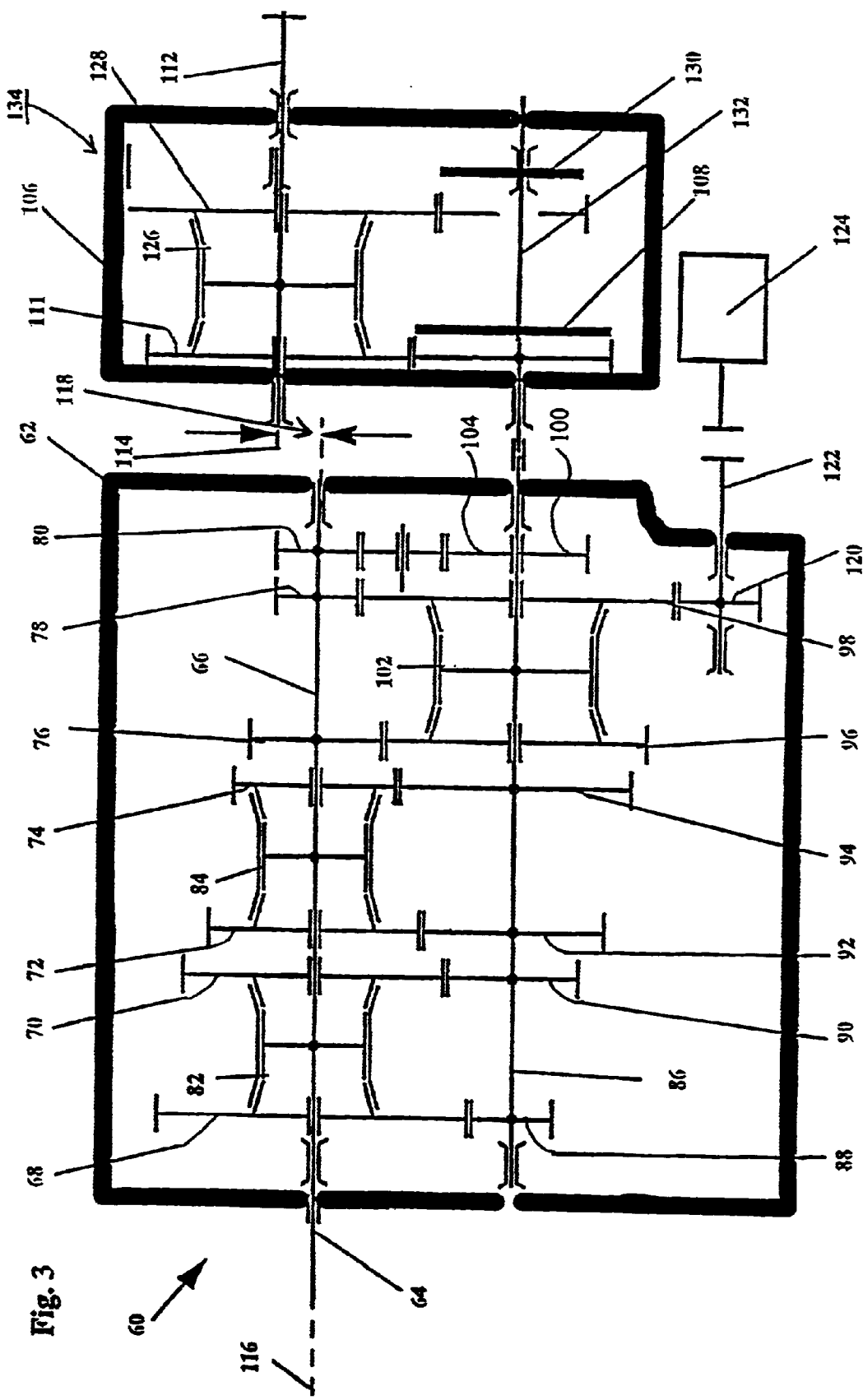

TRANSMISSION WITH NON-COAXIAL OUTPUT

The invention relates to a transmission having a main shaft and a countershaft.

BACKGROUND OF THE INVENTION

From the prior art, transmissions are already known having one input shaft, one main shaft, one countershaft and one output shaft in which in the input shaft, the main shaft and the output shaft are mounted on a common axis of rotation. Transmissions of this kind can have a one piece input and output shaft or a one piece main and output shaft. A transmission of this kind is shown, e.g. in DE 195 38 192.

The numbers of teeth on the gear wheels of the shafts are determined on the basis of the desired reduction ratios. This implies specific diameter ratios of the gear wheels of the parallel shafts relative to each other and thus also the spatial distance between the shafts. Thus the gear wheel pair consisting of the first gear wheel upon the input shaft and the first gear wheel upon the countershaft, seen from the input side, are configured so that a gear wheel of very small diameter upon the input shaft is associated with a gear wheel of very large diameter upon the countershaft. This pair of gear wheels makes a transmission of a great torque at a lower speed level possible, but a great spatial distance results in a large size of the transmission housing which can lead to difficulties in the installation space for the vehicle manufacturer.

SUMMARY OF THE INVENTION

The problem on which the invention is based is to reduce the installation space needed for a transmission and lead to a smaller size of the transmission.

It is proposed, according to the invention, to non-rotationally mount a gear wheel, upon the output shaft of the transmission, which is driven by a gear wheel non-rotationally connected with the countershaft, the gear wheel pair forming one constant. The input shaft of the transmission is non-rotationally connected with the main shaft. The axis of rotation of the input shaft and the axis of rotation of the main shaft are equal and the axis of rotation of the main shaft and the axis of rotation of the output shaft do not form the same axis. The distance between the axes of rotation of main shaft and output shaft is determined by the reduction ratio of the gear wheel pair of the constant.

In an advantageous development, the gear wheel pair of the constant is lodged in a separate transmission housing in order to make replacement of the gear wheel pair possible.

In another advantageous development for driving a hydrodynamic retarder, an auxiliary output shaft is provided which can be driven directly by the main shaft or the countershaft and serves to achieve a high rotational speed of the retarder without intercalation of a high driving step.

For a splitter transmission, an advantageous development shows upon the output shaft when a gear shift device subdivides the gear steps in half speed steps.

In an advantageous development, a range-change group transmission, in the form of a planetary transmission, is provided next to the gear wheel pair of the constant for enlarging the total spreading of the transmission.

By shifting the arrangement of a constant of the transmission to the output side end of the transmission and the non-coaxiality of the axes of rotation of main shaft and output shaft, the diameters of the large wheel of the transmission are reduced. With reduced diameters, the weight of the gear wheels thereby can be reduced and the axial distances of the parallel shafts shortened, which results in a smaller size for the transmission. A reduced size of the transmission means in this instance advantageously less weight and more installation space in the vehicle. At the same time, less expenditure in material and processing for smaller gear wheels and a housing results in lower cost. The smaller masses of the gear wheels to move and synchronize, when shifting, result in a level of shifting effort clearly. The synchronizing devices also are less apt to fail, since the masses to be synchronized are smaller. By virtue of the smaller gear wheels on the input-side end of the countershaft with a small axial distance between input shaft and main shaft and the countershaft, the rotational speeds of the countershaft are at a higher level. A reduced torque level, on which the structural parts of the transmission must be designed, is obtained thereby in the largest part of the transmission. A high torque only generates in the output constant when an enlarged axial distance exists between the output shaft and the countershaft. With the inventive arrangement, the transmission input torque can be designed the same size for transmission constructions having direct drive and overdrive versions.

As a result of a one piece design for the input shaft and the main shaft, the pivot bearing of the main shaft and the input shaft of the prior art can be eliminated. The gear wheel pair mounted on the transmission end can be configured so as to be inserted as a separate unit, after the other transmission housing, making a modular design of transmissions having different wheel pairs on the output constant possible.

BRIEF DESCRIPTION OF THE DRAWINGS

The invention is described in detail with reference to drawings wherein:

FIG. 3 is an arrangement according to FIG. 2 with splitter transmission.

DESCRIPTION OF THE PREFERRED EMBODIMENTS

Figure 1:
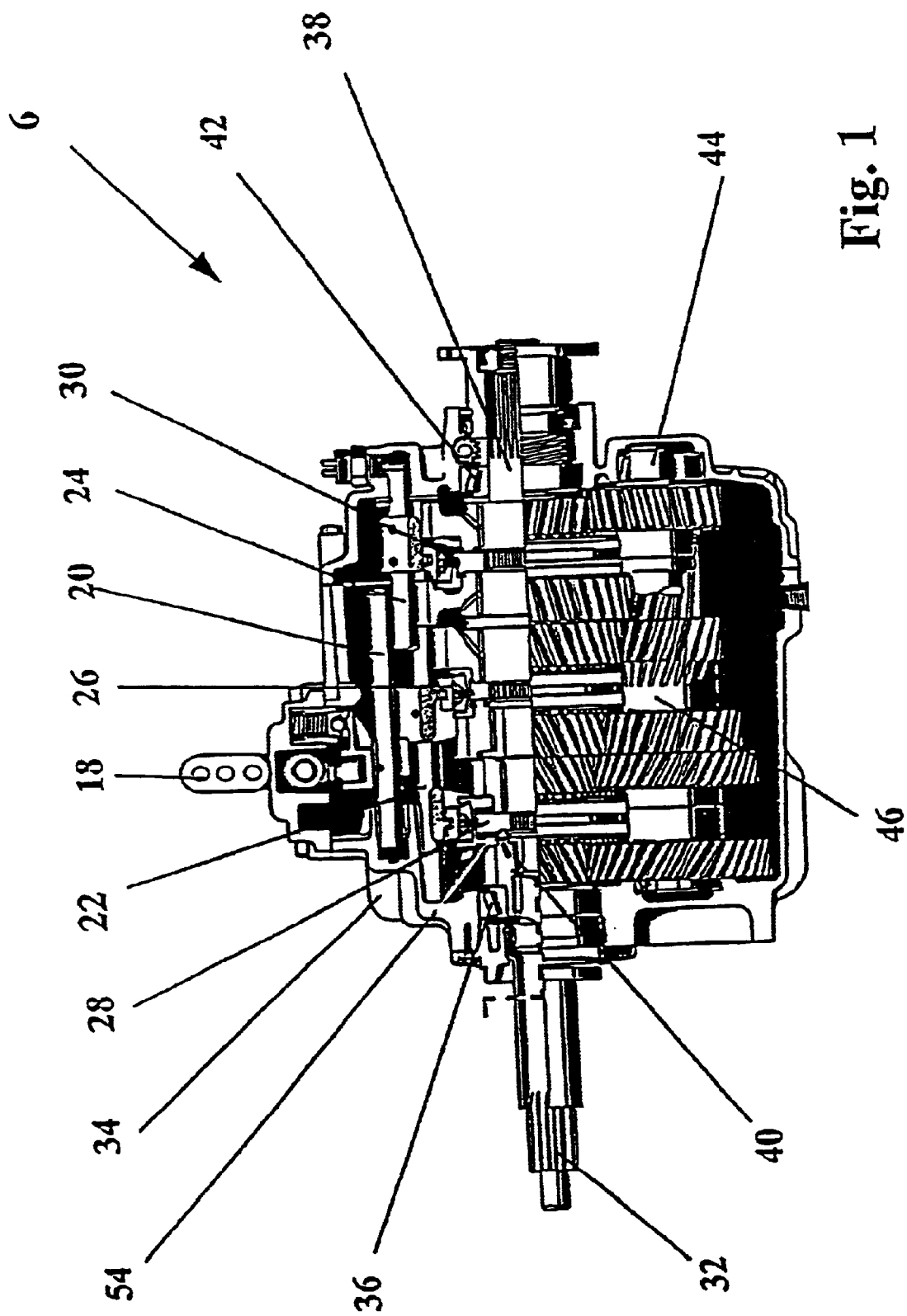
FIG. 1 is a transmission according to the prior art.

FIG. 1 shows an enlarged illustration of a transmission 6 according to the prior art having, e.g. five forward gears and one reverse gear. With a control lever 18 access is had to the three gearshift rods 20, 22 and 24 which, via gear shift forks, move the synchronizing devices 26, 28 and 30 to the desired gear shift positions. Thus the synchronizing device 30 engages the reverse gear and the first transmission ratio. The synchronizing device 26 engages the second and third gear steps while the synchronizing device 28 is used to engage the fourth and fifth gear steps. The input shaft 32 is supported in the transmission housing 34 by a support such as the bearing 36 shown here. The main shaft 38 is supported in the transmission input shaft 32 by a bearing 40 and in the housing 34 by a support such as a bearing 42 shown here. The reverse direction of rotation for the reverse gear is obtained by an intermediate gear 44 the toothing of which meshes with the toothing of the reverse gear wheel upon the main shaft 38 and the toothing of the countershaft 46. The other toothings of the gear wheels, on the main shaft 38, likewise engage with corresponding toothings of the countershaft 46 for the forward gear ratio. A toothing is additionally provided on the transmission input 32 for mounting a clutch body 54.

Figure 2:
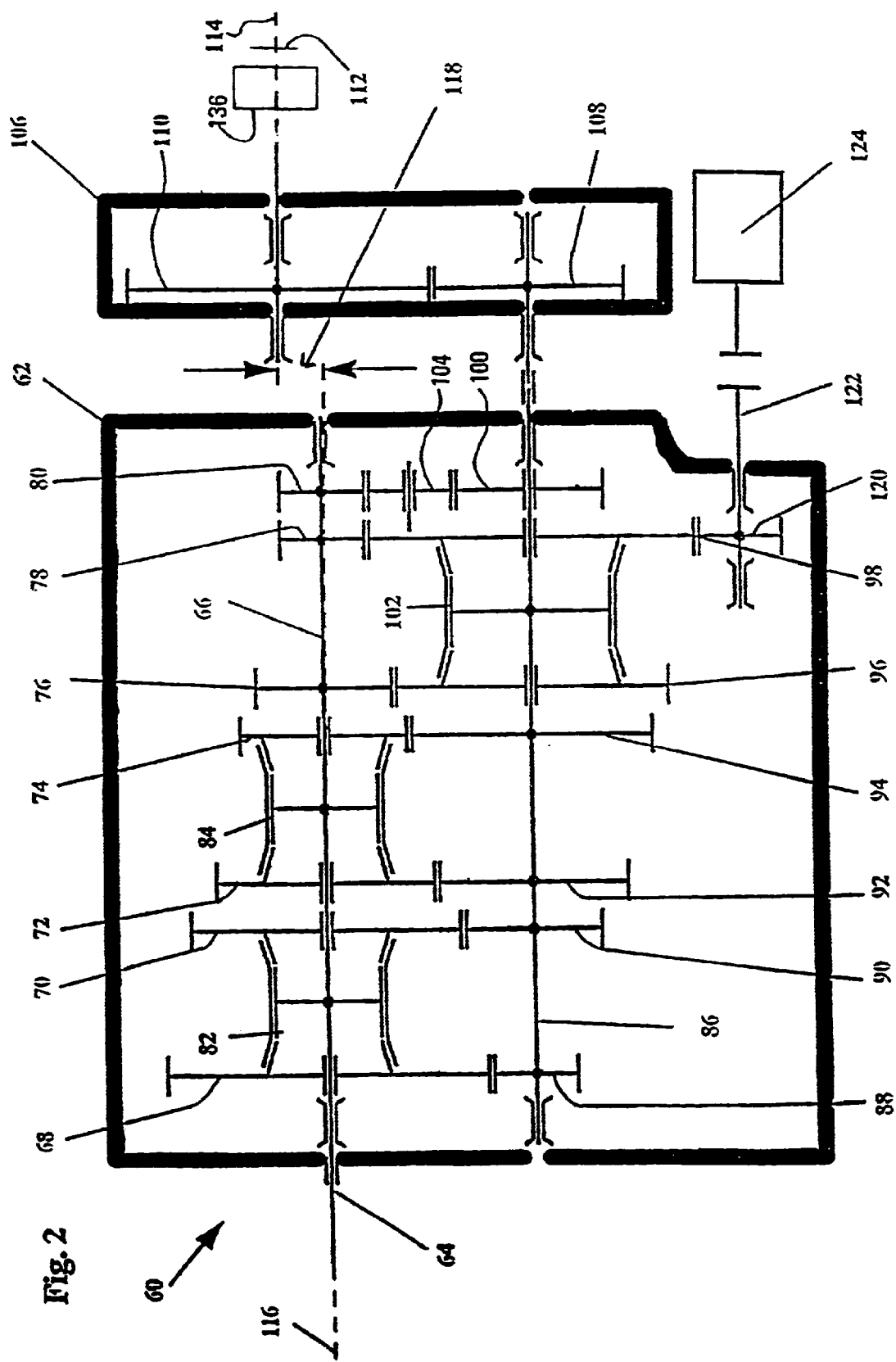
FIG. 2 is a diagrammatic arrangement of a transmission according to the invention.

In an advantageous development, the combination of transmission 60 and constant gear wheels 108, 110 may be supplemented by the provision of a Range Change Group Transmission 60RCG next to the gear wheel 110 of the constant, wherein the Range Change Group Transmission 60RCG may be implemented as a Planetary Transmission 136 in a conventional manner and as illustrated, thereby enlarging the total gear ratio spread of the transmission. In this regard, it is well known to those of skill in the arts that a planetary transmission may be operative and used to provide two, selectable constant gear ratios, while a multiple gear ratio transmission, such as transmission 106 shown in FIG. 2, is operative and used to provide a set of selectable gear ratios defining a range of gear ratios. It is further well known to those of skill in the relevant arts that the connection of a planetary transmission in "series" with a multiple gear ratio transmission will provide, in combination, a two stage transmission wherein one stage is comprised of the multiple gear ratio transmission and the second stage is comprised of the planetary transmission. The resulting two stage transmission will therefore have two ranges of gear ratios, wherein the gear ratios within either of the two ranges are determined and provided by the multiple gear ratio transmission and the range, that is, a selected one of either of the two ranges, is determined and selected by the planetary transmission. It will be well understood by those of skill in the relevant arts that the two gear ratio ranges may be separate or may overlap or may abut, depending upon the gear ratio range of the multiple gear ratio stage, but that the effect of the addition of the planetary transmission will be to increase the total gear ratio spread, that is, the total gear ratio range, of the combined transmission. For this reason, the planetary gear transmission is often referred to as a "range-change group transmission", that is, as a transmission selecting and changing a set of transmission gear ratios from among two or more sets of transmission gear ratios wherein the gear ratios within a given set are common to all the sets of gear ratios and are provided by another transmission or stage of the transmission. The details of a Planetary Transmission 136 and the interconnection of a Planetary Transmission 136 with other transmissions or transmission components will not be discussed in further detail herein as such are well known to and understood by those of ordinary skill in the relevant arts. FIG. 3 shows an enlarged arrangement, in comparison with that of FIG. 2, with a splitter transmission 134 in the housing 106 to form a second constant. A synchronizing device 126 is provided upon the output shaft 112 by which the gear wheel 111 or the gear wheel 128 can be optionally non-rotationally connected with the output shaft. The gear wheel 108 is non-rotationally situated jointly with a gear wheel 130 upon a shaft 132.

FIG. 2 shows a diagrammatic illustration of the transmission constructions according to the invention. A transmission 60 has a housing 62 in which an input shaft 64 projects. The input shaft 64 is designed integral with the main shaft 66 of the transmission 60. On the main shaft 66 seven gear wheels 68, 70, 72, 74, 76, 78, 80 are mounted of which the gear wheels 68, 70, 72, 74 can loosely rotate upon the main shaft 66 while the gear wheels 76, 78, 80 are permanently non-rotationally connected with the main shaft 66. A synchronizing device 82 is provided between the gear wheels 68 and 70 by which the gear wheel 68 or the gear wheel 70 can be optionally non-rotationally connected with the main shaft 66. A synchronizing device 84 is provided between the gear wheels 72 and 74 by which the gear wheel 72 or the gear wheel 74 can be optionally non-rotationally connected with the main shaft 66.

Seven gear wheels 88, 90, 92, 94, 96, 98, 100 are likewise provided upon the countershaft 86 of which the gear wheels 88, 90, 92, 94 are permanently non-rotationally connected with the countershaft 86. A synchronizing device 102 is provided between the gear wheels 96 and 98 by which the gear wheel 96 or the gear wheel 98 can be optionally non-rotationally connected with the countershaft 86. For the reverse gear, the gear wheel 100 meshes, for a reverse direction of rotation, with an intermediate gear 104 which, in turn, meshes with the gear wheel 80 upon the main shaft 66. The gear wheel 98 meshes with a gear wheel 120 upon an auxiliary output shaft 122 by which a retarder 124 is driven. Due to the large diameter of the gear wheel 98, the auxiliary output shaft 122 is driven at a high rotational speed.

In the illustration shown here, one other housing 106 is provided next to the transmission housing 62. A gear wheel pair consisting of two gear wheels 108 and 110 is mounted in the housing 106, the gear wheel 108 is non-rotationally connected with the countershaft 86. The gear wheel 110 is permanently non-rotationally connected with the output shaft 112, but the gear wheels 108 and 110 can also be situated within the adequately configured transmission housing 62. Gear wheel 110 and output shaft 112 rotate around an imaginary axis of rotation 114. The main shaft 66 and the gear wheels mounted thereon, the same as the input shaft 64, rotate around an axis of rotation 116. Both axes of rotation 114 and 116 are not coaxial with respect to each other, but are separated by an axial distance 118.

As described above, and as shown in FIG. 2, in an advantageous development, a range-change group transmission 136, in the form of a planetary transmission, is provided next to the gear wheel pair 108, 110 of the constant for enlarging the total spreading of the transmission. FIG. 3 shows an enlarged arrangement, in comparison with that of FIG. 2, with a splitter transmission 134 in the housing 106 to form a second constant. A synchronizing device 126 is provided upon the output shaft 112 by which the gear wheel 111 or the gear wheel 128 can be optionally non-rotationally connected with the output shaft. The gear wheel 108 is non-rotationally situated jointly with a gear wheel 130 upon a shaft 132.

| Reference numerals | | | |
|---|---|---|---|
| 6 | transmission | 84 | synchronizing device |
| 18 | control lever | 86 | countershaft |
| 20 | gearshift rod | 88 | gear wheel |
| 22 | gearshift rod | 90 | gear wheel |
| 24 | gearshift rod | 92 | gear wheel |
| 28 | synchronizing device | 94 | gear wheel |
| 30 | synchronizing device | 96 | gear wheel |
| 32 | transmission input shaft | 98 | gear wheel |
| 34 | transmission housing | 100 | gear wheel |
| 36 | bearing | 102 | synchronizing device |
| 38 | main shaft | 104 | intermediate gear |
| 40 | bearing | 106 | housing |
| 42 | bearing\44 intermediate gear | 108 | gear wheel |
| 46 | countershaft | 110 | gear wheel |
| 54 | clutch body | 111 | gear wheel |
| 60 | transmission | 112 | output shaft |
| 62 | transmission housing | 114 | axis of rotation |
| 64 | input shaft | 116 | axis of rotation |
| 66 | main shaft | 118 | axial distance |
| 68 | gear wheel | 120 | gear wheel |
| 70 | gear wheel | 122 | auxiliary output shaft |
| 72 | gear wheel | 124 | retarder |
| 74 | gear wheel | 126 | synchronizing device |
| 76 | gear wheel | 128 | gear wheel |

-continued

Reference numerals

| 78 | gear wheel | 130 | gear wheel |
| 80 | gear wheel | 132 | shaft |
| 82 | synchronizing device | 134 | splitter transmission |

What is claimed is:

1. A vehicle transmission (6, 60) comprising a countershaft transmission having:
   one input shaft (32, 64),
   one main shaft (38, 66),
   one countershaft 46, 86), and
   one output shaft (112);
   wherein the main shaft (38, 66) has a plurality of loose gear wheels (68, 70, 72, 74) and a plurality of fixed gear wheels (76, 78, 80) mounted thereon;
   the countershaft (46, 86) has a plurality of loose gear wheels (96, 98) and a plurality of fixed gear wheels (88, 90, 92, 94) mounted thereon;
   each of the input shaft, main shaft, countershaft and output shaft is rotatably mounted around an axis of rotation (114, 116);
      an output shaft output gear wheel (110, 111, 128) is non-rotatably mounted upon the output shaft (112) and is driven by a countershaft output gear wheel (108, 130) non-rotationally mounted on the countershaft (86);
      the output shaft output gear wheel (110, 111, 128) and the countershaft output gear wheel (108, 130) together form a constant output gear wheel pair;
      the input shaft (64) of the transmission (60) is non-rotationally connected with the main shaft(66);
      the input shaft axis of rotation (116) and the main shaft axis of rotation (116) are coincident with one another;
      the output shaft axis of rotation (114) is spaced from the main shaft axis of rotation (116) and a spacing distance (118) between the main shaft and output shaft axes of rotation (114, 116) is determined by a reduction ratio of the constant output gear wheel pair (108-110, 108-111, 130-128); and
      the constant output gear wheel pair (108-110, 108-111, 130-128) is accommodated within a separate transmission housing (106) to facilitate replacement of the constant output gear wheel pair (108-110, 108-111, 130-128).

2. A vehicle transmission (6, 60) comprising a countershaft transmission having:
   a single input shaft (32, 64),
   a single main shaft (38, 66),
   a singe countershaft (46, 86), and
   a single output shaft (112);
   wherein the single main shaft (38, 66) has a plurality of loose gear wheels (68, 70, 72, 74) and a plurality of fixed gear wheels (76, 78, 80) mounted thereon;
   the single countershaft (46, 86) has a plurality of loose gear wheels (96, 98) and a plurality of fixed gear wheels (88, 90, 92, 94) mounted thereon;
   each of the single input shaft, single main shaft, single countershaft and single output shaft is rotatably mounted around an axis of rotation (114, 116);
      an output shaft output gear wheel (110, 111, 128) is non-rotatably mounted upon the single output shaft (112) and is driven by a countershaft output gear wheel (108, 130) non-rotationally mounted on the single countershaft (86);
      the output shaft output gear wheel (110, 111, 128) and the countershaft output gear wheel (108, 130) together form a constant output gear wheel pair;
      the single input shaft (64) of the transmission (60) is non-rotationally connected with the single main shaft (66);
      the single input shaft axis of rotation (116) and the single main shaft axis of rotation (116) are coincident with one another;
      the output shaft axis of rotation (114) is spaced from the man shaft axis of rotation (116) and a spacing distance (118) between the main shaft and output shaft axes of rotation (114, 116) is determined by a reduction ratio of the constant output gear wheel pair (108-110, 108-111, 130-128); and
      an auxiliary output shaft (122) is provided for driving a hydrodynamic retarder (124) and the auxiliary output shaft (122) is driven by one of the main shaft (66) and the countershaft (86) to achieve a high rotational speed of the retarder (124) without intercalation of a high driving step.

3. A vehicle transmission (6, 60); comprising: a countershaft transmission having:
   an input shaft (32, 64),
   a main shaft (38, 66),
   a countershaft (46, 86), and
   an output shaft (112);
   wherein the main shaft (38, 66) has a plurality of loose gear wheels (68, 70, 72, 74) and a plurality of fixed gear wheels (76, 78, 80) mounted thereon;
   the countershaft (46, 86) has a plurality of loose gear wheels (96, 98) and a plurality of fixed gear wheels (88, 90, 92, 94) mounted thereon:
   each of the input shaft, main shaft, countershaft and output shafts is rotatably mounted around an axis of rotation (114, 116);
      an output shaft output gear wheel (110, 111, 128) is non-rotatably mounted upon the output shaft (112) and is driven by a countershaft output gear wheel (108, 130) non-rotationally mounted on the countershaft (86);
      the output shaft output gear wheel (110, 111, 128) and the countershaft output gear wheel (108, 130) together form a constant output gear wheel pair;
      the input shaft (64) of the transmission (60) is non-rotationally connected with the main shaft (66);
      the input shaft axis of rotation (116) and the main shaft axis of rotation (116) are coincident with one another; and
      the output shaft axis of rotation (114) is spaced from the main shaft axis of rotation (116) and a spacing distance (118) between the main shaft and output shaft axes of rotation (114, 116) is determined by a reduction ratio of the constant output gear wheel pair (108-110, 108-111, 130-128).

4. The vehicle transmission (6, 60) according to claim 3, wherein a synchronizing device (126), for a splitter transmission (134), is provided upon the output shaft (112) to subdivide gear steps into intermediate gear steps.

5. The vehicle transmission (6, 60) according to claim 3, wherein a range group transmission (136) is provided adjacent to the constant output gear wheel pair (108-110, 108-111, 130-128) to enlarge a total spread of the vehicle transmission (60).

* * * * *